(12) United States Patent
Yang et al.

(10) Patent No.: US 9,223,357 B2
(45) Date of Patent: Dec. 29, 2015

(54) TOUCH PANEL, MANUFACTURING METHOD THEREOF AND TOUCH DISPLAY DEVICE

(71) Applicant: BEIJING BOE OPTOELECTRONICS TECHNOLOGY CO., LTD., Beijing (CN)

(72) Inventors: Shengji Yang, Beijing (CN); Haisheng Wang, Beijing (CN); Yingming Liu, Beijing (CN); Weijie Zhao, Beijing (CN); Wei Li, Beijing (CN)

(73) Assignee: BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 196 days.

(21) Appl. No.: 14/075,251

(22) Filed: Nov. 8, 2013

(65) Prior Publication Data

US 2014/0132855 A1  May 15, 2014

(30) Foreign Application Priority Data

Nov. 9, 2012 (CN) .......................... 2012 1 0448761

(51) Int. Cl.
*G06F 1/16* (2006.01)
*G06F 3/044* (2006.01)

(52) U.S. Cl.
CPC ................ *G06F 1/169* (2013.01); *G06F 3/044* (2013.01); *Y10T 29/49117* (2015.01)

(58) Field of Classification Search
CPC ... G06F 1/169; G06F 3/044; Y10T 29/49117; H01L 27/3276; H01L 27/0255; H01L 27/0262; H01L 27/0277; H01L 27/0248; H01L 27/0292; H01L 27/0251; H01L 27/0259; H01L 21/28; H01L 21/768; H01L 21/76898; H01L 23/48; H01L 23/481; G02F 1/136286; B81B 3/00; B81B 3/0072
See application file for complete search history.

(56) References Cited

U.S. PATENT DOCUMENTS 8,144,140 B2 * 3/2012 Nishikawa et al. ............ 345/206
8,779,296 B2 * 7/2014 Katsui et al. ................... 174/251
(Continued)

FOREIGN PATENT DOCUMENTS

CN      102662519 A    9/2012
CN      202870781 U    4/2013

OTHER PUBLICATIONS

First Chinese Office Action Appln. No. 201210448761.4; Dated Feb. 3, 2015.
(Continued)

*Primary Examiner* — Jonathan Boyd
*Assistant Examiner* — Sardis Azongha
(74) *Attorney, Agent, or Firm* — Ladas & Parry LLP

(57) ABSTRACT

Embodiments of the present invention provide a touch panel, a manufacturing method thereof and a touch display device, the touch panel is provided with a buffer trench region disposed in a peripheral region of a transparent substrate, the buffer trench region, and comprising: a first laminated structure, disposed on the transparent substrate, comprising: a metallic wire, disposed on the transparent substrate; a first insulating wire, disposed on the metallic wire; a transparent electrode wire, disposed on the first insulating wire; a first passivation wire, disposed on the transparent electrode wire; a second laminated structure, disposed on the same layer as the first laminated structure, comprising: a second insulating wire, disposed on the transparent substrate; and a second passivation wire, disposed on the second insulating wire, wherein the second laminated structure and the first laminated structure are spaced apart from each other to form a trench.

20 Claims, 2 Drawing Sheets

(56) References Cited

U.S. PATENT DOCUMENTS

2006/0256095 A1* 11/2006 Bottari et al. .................. 345/173
2012/0313884 A1* 12/2012 Huang et al. .................. 345/174

OTHER PUBLICATIONS

Second Chinese office Action Appln. No. 201210448761.4; Dated Sep. 2, 2015.

* cited by examiner

TOUCH PANEL, MANUFACTURING METHOD THEREOF AND TOUCH DISPLAY DEVICE

TECHNICAL FIELD

Embodiments of the present invention relate to a touch panel, a manufacturing method thereof and a touch display device.

BACKGROUND

With a rapid development of display technology, touch panels have been gradually popularized in people's lives. At present, the touch panels may be divided into the following types according to the working principle: a resistive type, a capacitive type, an infrared type, a surface acoustic wave type, an electromagnetic type, a dispersive signal type, and an inhibited total internal reflection optical sensing type, etc. Among these, a capacitive touch panel has been sought after as a new favorite in the industry because of its special touch principle, advantages such as high sensitivity, long lifespan, and high transmission.

For a capacitive touch panel, OGS (One Glass Solution, OGS) touch panel has occupied a certain share in the high-end market. The OGS touch panel comprises a four-layer structure, i.e. a metallic layer, an insulating layer, a transparent electrode layer, and a passivation protective layer formed in turn on a glass substrate. In a producing process of the OGS touch panel, an edge enhancement process is a crucial factor to determine the product yield. The edge enhancement process refers to: forming a protective acid-proof ink coating on two surfaces of the touch panel, immersing the touch panel formed with the acid-proof ink coating into an acid substance (e.g. hydrofluoric acid), and corroding away burrs generated when a glass substrate is cut, so as to enhance edge strength of the touch panel.

However, because a sealing between the acid-proof ink coating and a periphery region of the touch panel is relatively poor, when the OGS touch panel is edge-enhanced, the acid substance will easily enter an interior region from the peripheral region of the touch panel, resulting in corroding and damaging interior structures (e.g. a transparent electrode), and affecting the product yield.

SUMMARY

Embodiments of the present invention provide a touch panel, a manufacturing method thereof and a touch display device, for improving sealing between an acid-proof ink coating and the touch panel, preventing interior structures of the touch panel from being corroded and damaged due to an acid substance or alleviating the damage, and improving the product yield.

An embodiment of the present invention provides a touch panel, provided with a buffer trench region disposed in a peripheral region of a transparent substrate, the buffer trench region comprising: a first laminated structure, disposed on the transparent substrate, comprising: a metallic wire, disposed on the transparent substrate; a first insulating wire, disposed on the metallic wire; a transparent electrode wire, disposed on the first insulating wire; a first passivation wire, disposed on the transparent electrode wire; a second laminated structure, disposed on the same layer as the first laminated structure, comprising: a second insulating wire, disposed on the transparent substrate; and a second passivation wire, disposed on the second insulating wire, wherein the second laminated structure and the first laminated structure are spaced apart from each other to form a trench.

An embodiment of the present invention further provide a method of manufacturing a touch panel, comprising: forming a metallic wire in a buffer trench region disposed in a peripheral region of a transparent substrate; forming a first insulating wire disposed on the metallic wire on the transparent substrate formed with the metallic wire, and forming a second insulating wire disposed on the transparent substrate and spaced apart from the metallic wire and the first insulating wire; forming a transparent electrode wire disposed on the first insulating wire on the transparent substrate formed with the first insulating wire and the second insulating layer; forming a first passivation wire disposed on the transparent electrode wire on the transparent substrate formed with the transparent electrode wire, and forming a second passivation wire disposed on the second insulating wire, wherein the second laminated structure comprising the second insulating wire and the second passivation wire and the first laminated structure comprising the metallic wire, the first insulating wire, the transparent electrode wire and the first passivation wire are spaced apart from each other to form a trench.

Additionally, an embodiment of the present invention further provides a touch display device, comprising the aforementioned touch panel.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

To improve sealing of an acid-proof ink coating and a peripheral region of a touch panel, prevent interior structures of the touch panel from being corroded and damaged due to an acid substance or alleviate the damage during a edge enhancement process, and improve the product yield, embodiments of the present invention provide a touch panel, a method of manufacturing the touch panel and a touch display device. In the touch panel according to the embodiment of the present invention, a laminated structure comprising a second insulating wire and a second passivation wire and a laminated structure comprising a metallic wire, a first insulating wire, a transparent electrode wire and a first passivation wire are spaced apart from each other to form a trench. Arranging the trench has greatly increased a contact area between the periphery region of the touch panel and the acid-proof ink coating, thereby improving the adhesive sealing between the acid-proof ink coating and the touch panel.

Embodiments of the present invention will now be described in detail in connection with the drawings.

Figure 1:
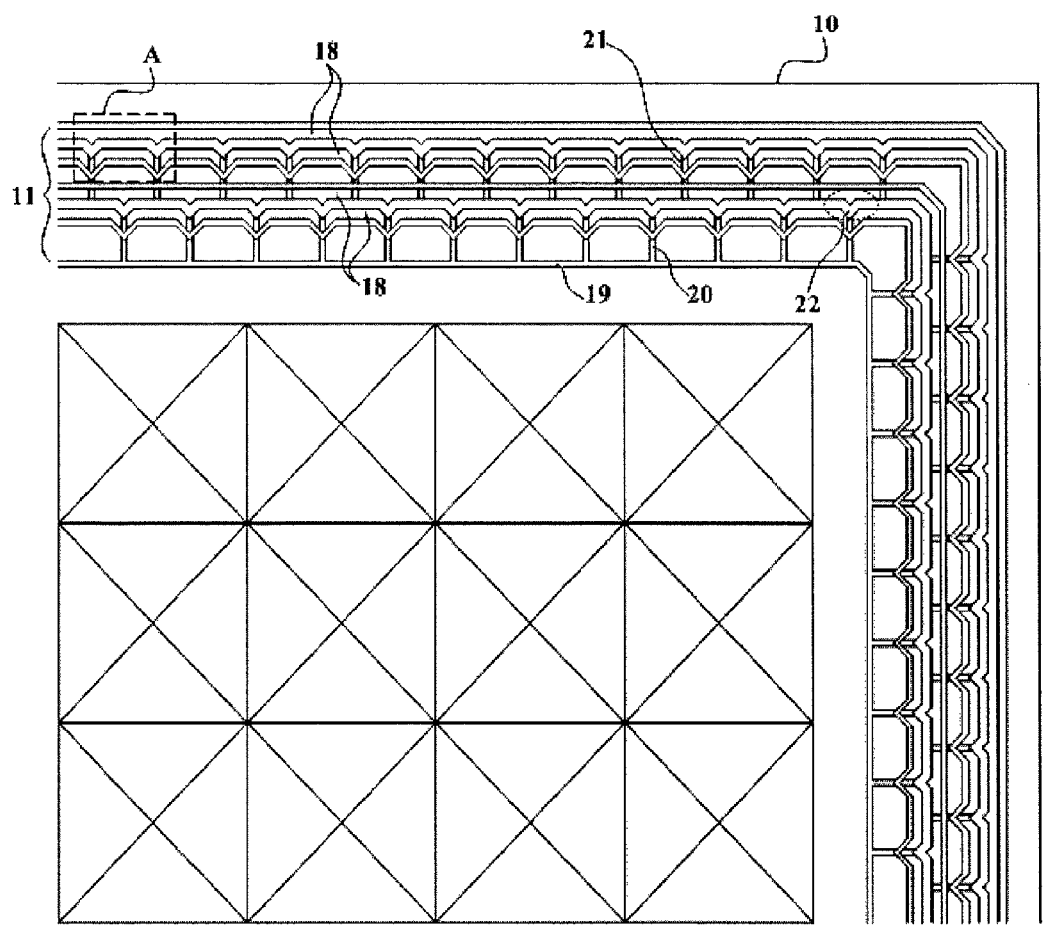
FIG. 1 is a schematic structural top view of a peripheral region of a touch panel according to an embodiment of the present invention.
Figure 2:
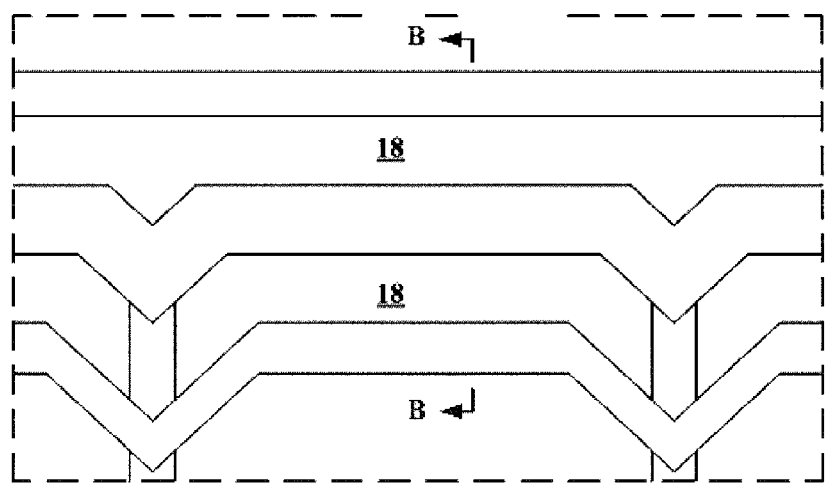
FIG. 2 is a partially enlarged view of A in FIG. 1.
Figure 3:
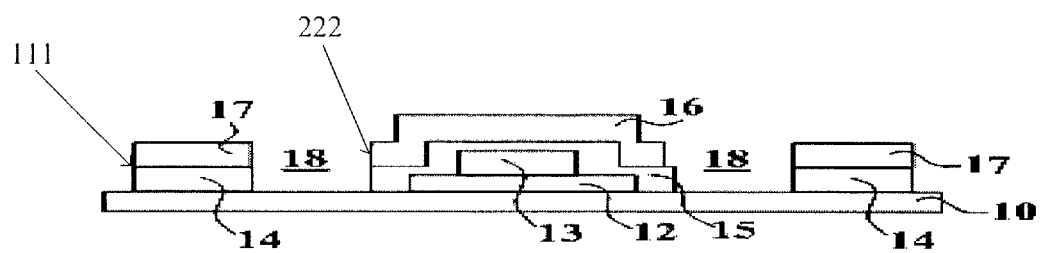
FIG. 3 is a schematic cross-sectional view of a touch panel taken along a line of B-B in FIG. 2.

As shown in FIG. 1, FIG. 2, and FIG. 3, FIG. 1 is a schematic structural top view of a peripheral region of a touch panel according to an embodiment of the present invention; FIG. 2 is a partially enlarged view of A in FIG. 1; and FIG. 3 a schematic cross-sectional view of a touch panel taken along a line of B-B in FIG. 2; the touch panel according to an embodiment of the present invention, comprising: a transparent substrate 10 and a buffer trench region 11 disposed in a peripheral region of the transparent substrate 10, the buffer trench region 11 comprising: a first laminated structure 111 disposed on the transparent substrate, comprising: a metallic wire 12 disposed on the transparent substrate 10, a first insulating wire 13 disposed on the metallic wire 12, a transparent electrode wire 15 disposed on the first insulating wire 13, and a first passivation wire 16 disposed on the transparent electrode wire 15; and a second laminated structure 222 disposed in the same layer as the first laminated structure 111, comprising: a second insulating wire 14 disposed on the transparent substrate 10 and a second passivation wire 17 disposed on the second insulating wire 14, wherein the second laminated structure 222 comprising the second insulating wire 14 and the second passivation wire 17 and the first laminated structure 111 comprising the metallic wire 12, the first insulating wire 13, the transparent electrode wire 15 and the first passivation wire 16 are spaced apart from each other to form a trench 18.

In the embodiment of the present invention, because in the peripheral region of the transparent substrate 10 is disposed the buffer trench region 11, in which the second laminated structure 222 comprising the second insulating wire 14 and the second passivation wire 17 and the first laminated structure 111 comprising the metallic wire 12, the first insulating wire 13, the transparent electrode wire 15 and the first passivation wire 16 are spaced apart from each other to form a trench 18, when an acid-proof ink coating is formed on a surface of the touch panel, arranging the trench 18 has greatly increased a contact area between the periphery region of the touch panel and the acid-proof ink coating, thereby improving the adhesive sealing between the acid-proof ink coating and the touch panel, effectively preventing acid substance from entering interior of the touch panel from the periphery of the touch panel to damage interior structures of the touch panel, and improving the product yield.

Exemplarily, the transparent substrate 10 may be a glass substrate, a plastic substrate, or a resin substrate, etc, and a width of the trench 18 may be determined according to characteristic of the acid-proof ink and specific printing technology.

Further, FIGS. 1-3 have provided such an embodiment. In the embodiment, there may be two second insulating wires 14, respectively disposed at both sides of the metallic wire 12; and there may be two second passivation wires 17, respectively disposed on the two second insulating wires 14. In this case, two trenches 18 are formed between the first laminated structure comprising the metallic wire 12, the first insulating wire 13, the transparent electrode wire 15 and the first passivation wire 16 and the second laminated structures each comprising the second insulating wire 14 and the second passivation wire 17, further increasing the contact area between the periphery region of the touch panel and the acid-proof ink coating, and improving the adhesive sealing of the acid-proof ink coating and the touch panel.

Further, referring to FIG. 3, in the touch panel according to the embodiment of the present invention, a width of the first insulating wire 13 may be less than that of the metallic wire 12, and the transparent electrode wire 15 covers the first insulating wire 13 and is partly lapped over and directly connected to the metallic wire 12 at both sides of the first insulating wire 13. In this way, a lateral face of a laminated structure comprising the metallic wire 12 and the first insulating wire 13 is in a shape of step, and a lateral face of a laminated structure comprising the transparent electrode wire 15 and the first passivation wire 16 is also in a shape of step, thus, further increasing the contact area between the periphery region of the touch panel and the acid-proof ink coating, and facilitating printing and coating of the acid-proof ink and improving the adhesive sealing of the acid-proof ink coating and the touch panel.

As shown in FIG. 1, the illustrated touch panel further comprises an anti-electrostatic-damage short circuit ring 19 disposed on the transparent substrate 10 and outside the buffer trench region 11, the metallic wire 12 is connected to the anti-electrostatic-damage short circuit ring 19 via a plurality of first metallic connecting wires 20. Exemplarily, the anti-electrostatic-damage short circuit ring 19 and the metallic wire 12 are disposed in the same layer or in different layers. Exemplarily, if the anti-electrostatic-damage short circuit ring 19 and the metallic wire 12 are disposed in different layers, e.g. disposed in the same layer as the transparent electrode 15, on the transparent substrate outside the buffer trench region 11 is further disposed an insulating layer disposed in the same layer as the first insulating wire, and the insulating layer is formed with through holes; the plurality of first metallic connecting wires 20 passes through the insulating layer to reach the through holes therein to be electrically connected to the anti-electrostatic-damage short circuit ring 19, while the other ends of the plurality of first metallic connecting wires 20 are electrically connected to the metallic wire 12.

In this case, if the anti-electrostatic-damage short circuit ring 19 is broken by corrosion of acid substance during the edge enhancement process, because the metallic wire 12 is electrically connected to the anti-electrostatic-damage short circuit ring 19 via a plurality of first metallic connecting wires 20, the anti-electrostatic-damage short circuit ring 19 and the metallic wire 20 may form a conducting loop, and the operating characteristic of the anti-electrostatic-damage short circuit ring 19 will not be affected. Moreover, such design allows an effective directly facing area between the anti-electrostatic-damage short circuit ring 19 and the metallic wire 12 and a metallic frame of a touch display device to be larger, which is advantageous to dispersion of an electrostatic charge, thereby not only improving a high electrostatic load capacity of the anti-electrostatic-damage short circuit ring 19, but also facilitating timely release of the high-voltage electrostatic.

Further, as shown in FIG. 3, a width of the first insulating wire 13 is less than that of the metallic wire 12, while the transparent electrode wire 15 covers a whole of the metallic wire 12, allowing that the transparent electrode wire 15 is partly lapped over and directly connected to the metallic wire 12 so as to form an electrical connection, which is equivalent to that the metallic wire 12 is connected in parallel with the transparent electrode wire 15; the parallel resistance value of the metallic wire 12 and the transparent electrode wire 15 is smaller, which is advantageous to release of the electrostatic charge.

The metallic wire 12 may be arranged in the periphery of the transparent substrate 10 in various manners, for example, in one specific embodiment of the present invention, the metallic wire 12 may be at least two, and two adjacent metallic wires 12 are connected to each other via a plurality of second metallic connecting wires 21. In such design, at least two metallic wires 12 are electrically connected, and are further electrically connected to the anti-electrostatic-damage short circuit ring 19; and at least two metallic wires 12 are at the same potential with the anti-electrostatic-damage short circuit ring 19. The reason why the metallic wire 12 is arranged to be at least two is that it may further increase the effective directly facing area between the anti-electrostatic-damage short circuit ring 19 and the metallic wire 12 and the metallic frame of the touch display device, which is more advantageous to the dispersion of the electrostatic charge.

Exemplarily, in the embodiments of the present invention, the metallic wire 12 may be more than two, and two adjacent metallic wires 12 are connected to each other via a plurality of second metallic connecting wires 21.

Herein, it should be noted that any one metallic wire 12 is formed with a first insulating layer 13, a transparent electrode wire 15, and a second insulating layer 16 formed thereon, wherein a trench 18 is formed between the laminated structure comprising any one metallic wire and the first insulating layer 13, the transparent electrode wire 15, and the second insulating layer formed thereon and its adjacent metallic wire 12, thus, further increasing the contact area between the periphery region of the touch panel and the acid-proof ink coating, and improving the adhesive sealing of the acid-proof ink coating and the touch panel.

The metallic wire 12 may be in various shapes, such as, a straight line, a folding line, or a curved line. Exemplarily, in the embodiments of the present application, the metallic wire 12 is in a shape of a folding line or a wave line, because an extending length of the metallic wire 12 in a shape of the folding line or the wave line is more than that of a metallic wire in a shape of a straight line, such that the trench 18 has a greater extending length, further increasing the contact area between the periphery region of the touch panel and the acid-proof ink coating, and improving the adhesive sealing of the acid-proof ink coating and the touch panel. In the embodiment as shown in FIG. 1, two metallic wires 12 are illustrated, each metallic wire 12 comprising triangular folding lines 22 spaced apart and folded inward, and the two metallic wires 12, the plurality of first metallic connecting wires 20, the plurality of second metallic connecting wires 21, and the anti-electrostatic-damage short circuit ring 19 form a grid structure.

Exemplarily, a width of the buffer trench region 11 is not more than 5 millimeters, thus, the proportion of a region of the touch panel except an effective display region is relatively small on the premise of ensuring the contact area between the periphery region of the touch panel and the acid-proof ink coating, which is advantageous to improving the cutting output capacity of the transparent substrate and increasing the output of the touch panel.

Exemplarily, in a direction parallel to a plane where a surface of the transparent substrate is located, two or more of a structure comprising the second laminated structures, the trench, the first laminated structure, the trench, and the second laminated structure are spaced apart from each other in the buffer trench region, wherein a trench is formed between any two adjacent structures, and the metallic wires of the first laminated structure in the two or more structures are connected to each other via a plurality of second metallic connecting wires penetrating through the trenches and the second laminated structures.

Exemplarily, in a direction parallel to a plane where a surface of the transparent substrate is located, two or more of a structure comprising the second laminated structures, the trench and the first laminated structure are spaced apart from each other in the buffer trench region, wherein a trench is formed between any two adjacent structures, and the metallic wires of the first laminated structure in the two or more structures are connected to each other via a plurality of second metallic connecting wires penetrating through the trenches and the second laminated structure.

Exemplarily, as shown in FIG. 1, in a direction parallel to a plane where a surface of the transparent substrate is located, two or more of a structure comprising the second laminated structures, the trench, the first laminated structure, the trench, and the second laminated structure are spaced apart from each other in the buffer trench region, wherein a trench is formed between any two adjacent structures, and the metallic wires of the first laminated structure in the two or more structures are connected to each other via a plurality of second metallic connecting wires penetrating through the trenches and the second laminated structures.

The touch display device according to an embodiment of the present invention comprises the touch panel in any one of the preceding embodiments, and has a higher product yield.

Figure 4:
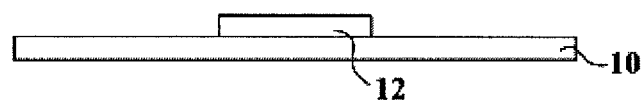
FIG. 4 is a schematic cross-sectional view of a touch panel taken along a line of B-B in FIG. 2 after a first patterning process.

In another aspect, an embodiment of the present invention provides a method of manufacturing a touch panel, comprising the following steps:

Step 101, forming a metallic wire 12 in a buffer trench region 11 in a peripheral region of a transparent substrate 10. An anti-electrostatic-damage short circuit ring 19 disposed on the transparent substrate 10 and a plurality of first metallic connecting wires 20 connecting the metallic wire 12 and the anti-electrostatic-damage short circuit ring 19 may be formed while the metallic wire 12 is formed. When the metallic wire 12 is at least two, a plurality of second metallic connecting wires 21 connecting two adjacent metallic wires 12 may be formed on the transparent substrate 10 while at least two metallic wires 12 are formed. The step may be performed by one patterning process, referring to FIG. 4 for a cross-sectional structure after a first patterning process.

The first patterning process generally comprises substrate cleaning, film formation, photoresist coating, exposure, development, etching, photoresist removing, and the like; a metallic layer is usually formed by using a physical vapor deposition method (e.g. a magnetron sputtering method), and then is patterned by a wet etching; and a non-metallic layer is usually formed by using a chemical vapor deposition method, and then is patterned by a dry etching. The following steps have the same principle as above, and details are omitted.

Figure 5:
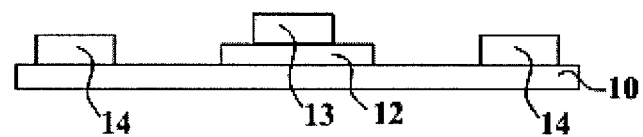
FIG. 5 is a schematic cross-sectional view of a touch panel taken along a line of B-B in FIG. 2 after a second patterning process.

Step 102, forming a first insulating wire 13 disposed on the metallic wire 12 on the transparent substrate formed with the metallic wire 12, and forming a second insulating wire 14 disposed on the transparent substrate 10 and spaced apart from the metallic wire 12 and the first insulating wire 13. The step may be performed by one patterning process, referring to FIG. 5 for a cross-sectional structure after a second patterning process.

Figure 6:
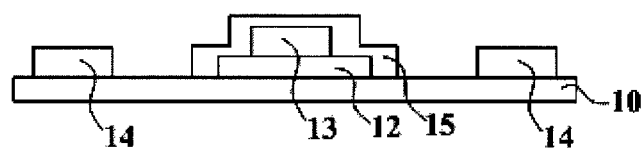
FIG. 6 is a schematic cross-sectional view of a touch panel taken along a line of B-B in FIG. 2 after a third patterning process.

Step 103, forming a transparent electrode wire 15 disposed on the first insulating wire 13 on the transparent substrate formed with the first insulating wire 13 and the second insulating wire 14. The step may be performed by one patterning process, referring to FIG. 6 for a cross-sectional structure after a third patterning process.

Step 104, forming a first passivation wire 16 disposed on the transparent electrode wire 15 on the transparent substrate formed with the transparent electrode wire 15, and forming a second passivation wire 17 disposed on the second insulating wire 14. The step may be performed by one patterning process, referring to FIG. 3 for a cross-sectional structure after a fourth patterning process.

It may be seen from the aforementioned steps that the second laminated structure 222 comprising the second insulating wire 14 and the second passivation wire 17 and the first laminated structure 111 comprising the metallic wire 12, the first insulating wire 13, the transparent electrode wire 15, and the first passivation wire 16 are spaced apart from each other to form a trench 18; when an acid-proof ink coating is formed on a surface of the touch panel, arranging the trench 18 has greatly increased a contact area between the periphery region of the touch panel and the acid-proof ink coating, thereby improving the adhesive sealing between the acid-proof ink coating and the touch panel, effectively preventing acid substance from entering interior of the touch panel from the periphery of the touch panel to damage interior structures of the touch panel during the edge enhancement process, and improving the product yield.

Exemplarily, the anti-electrostatic-damage short circuit ring and the transparent electrode wire may be formed simultaneously; in this way the method of manufacturing the touch panel according to the embodiment of the present application further comprises: forming an insulating layer disposed on the transparent substrate and outside the buffer trench region while forming the first insulating wire, wherein the insulating layer is formed with through holes; forming the anti-electrostatic-damage short circuit ring on the insulating layer while forming the transparent electrode wire, wherein conductive material forming the anti-electrostatic-damage short circuit ring is further filled in the through holes; forming a plurality of first metallic connecting wires simultaneously with the metallic wire and connecting the metallic wire and the anti-electrostatic-damage short circuit ring, wherein the plurality of first metallic connecting wires passes through the insulating layer to reach the through holes.

The embodiment of the invention being thus described, it will be obvious that the same may be varied in many ways. Such variations are not to be regarded as a departure from the spirit and scope of the invention, and all such modifications as would be obvious to those skilled in the art are intended to be included within the scope of the following claims.

The invention claimed is:

1. A touch panel, provided with a buffer trench region disposed in a peripheral region of a transparent substrate, the buffer trench region comprising:
   a first laminated structure, disposed on the transparent substrate, comprising:
      a metallic wire, disposed on the transparent substrate;
      a first insulating wire, disposed on the metallic wire;
      a transparent electrode wire, disposed on the first insulating wire;
      a first passivation wire, disposed on the transparent electrode wire;
   a second laminated structure, disposed on the same layer as the first laminated structure, comprising:
      a second insulating wire, disposed on the transparent substrate; and
      a second passivation wire, disposed on the second insulating wire,
   wherein the second laminated structure and the first laminated structure are spaced apart from each other to form a trench.

2. The touch panel according to claim 1, wherein there are two second insulating wires respectively disposed at both sides of the metallic wire; and there are two second passivation wires respectively disposed on the two second insulating wires.

3. The touch panel according to claim 1, wherein a width of the first insulating wire is smaller than that of the metallic wire, and the transparent electrode wire covers the first insulating wire, is partly lapped over and directly connected to the metallic wire at both sides of the first insulating wire.

4. The touch panel according to claim 1, further comprising: an anti-electrostatic-damage short circuit ring, disposed on the transparent substrate and outside the buffer trench region, wherein the metallic wire is connected to the anti-electrostatic-damage short circuit ring via a plurality of first metallic connecting wires.

5. The touch panel according to claim 4, wherein the anti-electrostatic-damage short circuit ring and the metallic wire are disposed in the same layer or in different layers.

6. The touch panel according to claim 4, wherein there are two or more metallic wires, and two adjacent metallic wires are connected to each other via a plurality of second metallic connecting wires.

7. The touch panel according to claim 6, wherein the metallic wires are disposed to be adjacent to each other and a trench is formed between any two adjacent metallic wires.

8. The touch panel according to claim 7, wherein on each of the metallic wires is disposed the first insulating wire, the transparent electrode wire, and the first passivation wire.

9. The touch panel according to claim 1, wherein there are two or more metallic wires, and two adjacent metallic wires are connected to each other via a plurality of second metallic connecting wires.

10. The touch panel according to claim 1, wherein the metallic wire is in a shape of a folding line or a wave line.

11. The touch panel according to claim 10, wherein the metallic wire comprises triangular folding lines spaced apart from each other and folded inward.

12. The touch panel according to claim 1, wherein a width of the buffer trench region is not more than 5 millimeters.

13. The touch panel according to claim 1, wherein in a direction parallel to a plane where a surface of the transparent substrate is located, two or more of a structure comprising the second laminated structures, the trench and the first laminated structure are spaced apart from each other in the buffer trench region, wherein a trench is formed between any two adjacent structures, and the metallic wires of the first laminated structure in the two or more structures are connected to each other via a plurality of second metallic connecting wires penetrating through the trenches and the second laminated structure.

14. The touch panel according to claim 1, wherein in a direction parallel to a plane where a surface of the transparent substrate is located, two or more of a structure comprising the second laminated structures, the trench, the first laminated structure, the trench, and the second laminated structure are spaced apart from each other in the buffer trench region, wherein a trench is formed between any two adjacent structures, and the metallic wires of the first laminated structure in the two or more structures are connected to each other via a plurality of second metallic connecting wires penetrating through the trenches and the second laminated structures.

15. The touch panel according to claim 3, wherein a lateral face of a laminated structure comprising the metallic wire and the first insulating wire is in a shape of step, and a lateral face of a laminated structure comprising the transparent electrode wire and the first passivation wire is also in a shape of step.

16. A touch display device, comprising the touch panel according to claim 1.

17. A method of manufacturing a touch panel according to claim 1, comprising:
    forming a metallic wire in a buffer trench region disposed in a peripheral region of a transparent substrate;
    forming a first insulating wire disposed on the metallic wire on the transparent substrate formed with the metallic wire, and forming a second insulating wire disposed on the transparent substrate and spaced apart from the metallic wire and the first insulating wire;
    forming a transparent electrode wire disposed on the first insulating wire on the transparent substrate formed with the first insulating wire and the second insulating layer;
    forming a first passivation wire disposed on the transparent electrode wire on the transparent substrate formed with the transparent electrode wire, and forming a second passivation wire disposed on the second insulating wire, wherein the second laminated structure comprising the second insulating wire and the second passivation wire and the first laminated structure comprising the metallic wire, the first insulating wire, the transparent electrode wire and the first passivation wire are spaced apart from each other to form a trench.

18. The method according to claim 17, further comprising: forming an anti-electrostatic-damage short circuit ring disposed on the transparent substrate and outside the buffer trench region, and forming a plurality of first metallic connecting wires connecting the metallic wire and the anti-electrostatic-damage short circuit ring while forming the metallic wire.

19. The method according to claim 17, wherein there are at least two metallic wires, the method comprising: forming a plurality of second metallic connecting wires connecting two adjacent metallic wires on the transparent substrate while forming the at least two metallic wires.

20. The method according to claim 17, further comprising: forming an insulating layer disposed on the transparent substrate and outside the buffer trench region while forming a first insulating wire, wherein the insulating layer is formed with through holes;
    forming an anti-electrostatic-damage short circuit ring on the insulating layer while forming the transparent electrode wire, wherein conductive material forming the anti-electrostatic-damage short circuit ring is further filled in the through holes;
    forming a plurality of first metallic connecting wires simultaneously with the metallic wire and connecting the metallic wire and the anti-electrostatic-damage short circuit ring, wherein the plurality of first metallic connecting wires passes through the insulating layer to reach the through holes.

* * * * *